Aug. 17, 1937.                A. URFER                 2,089,987
             MEANS FOR OPERATING A REPEATING DEVICE
                       Filed May 8, 1930
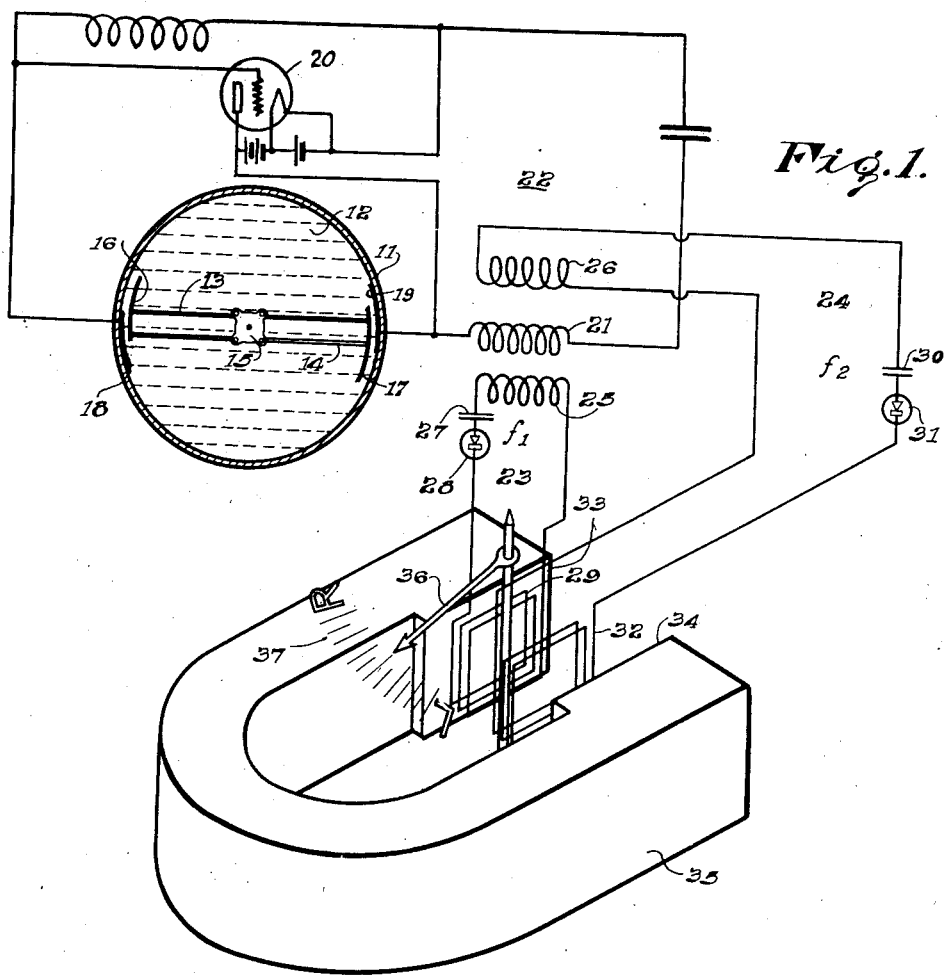
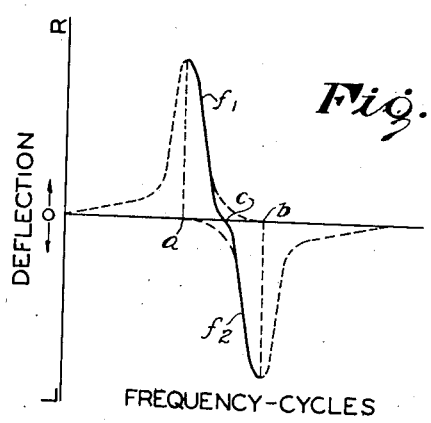
INVENTOR
Adolph Urfer
BY F. B. Smith
ATTORNEY Patented Aug. 17, 1937

2,089,987

UNITED STATES PATENT OFFICE 2,089,987

MEANS FOR OPERATING A REPEATING DEVICE

Adolph Urfer, Richmond Hill, N. Y., assignor to Pioneer Instrument Company, Incorporated, Brooklyn, N. Y., a corporation of New York Application May 8, 1930, Serial No. 450,851

7 Claims. (Cl. 177—351)

The present invention relates to navigational devices and more particularly to means adapted to indicate the deviation of a mobile object, such as a ship, from a selected or predetermined path or course.

One of the objects of the present invention is to provide, in combination with a directional or controlling device such as a magnetic compass, novel means for indicating differences in the relative angular position between the directional device and a mobile object, such as a ship or an aircraft, on which said device is mounted.

Another object of the invention is to provide, in combination with a magnetic compass, novel means including an indicator located at a distance from said compass for indicating relative angular movement between the compass card and the mobile object on which said compass is mounted.

A further object is to provide a novel repeating device of the class described, the operation of which shall be performed electrically rather than mechanically and which depends on the principle of electro-magnetic induction.

Still another object is to provide novel means for association with a magnetic compass which is so designed as to depend for operation upon changes in the reactance of an electrical circuit or circuits energized by an alternating current whereby the directional force of the magnetic compass is unaffected and the use of a circuit embodying an electrolyte is rendered unnecessary.

A still further object is to provide novel means for association with a magnetic compass which is so designed as to depend for operation upon the tuning of an electrical circuit or circuits to resonance at a selected frequency by relative movement between the mobile object and the magnetic elements of the compass.

Other objects and advantages of the invention will appear more fully hereinafter from the following description taken together with the accompanying drawing which illustrates one embodiment of the invention. It is to be expressly understood, however, that the drawing is for purposes of illustration only and is not designed as a definition of the limits of the invention, reference being had for this purpose to the appended claims.

In the drawing:

Fig. 1 is a schematic circuit diagram of one embodiment of the invention; and

Fig. 2 is a graphical illustration of certain principles of operation thereof.

In the form shown in Fig. 1, 11 indicates a compass bowl which may be filled with a liquid 12 such as Varnolene, kerosene or other suitable liquid, preferably one having high dielectric properties. Pivotally mounted in said bowl and centrally located therein are magnetic needles 13 and 14 held firmly together by means of a central bracket 15 which also serves as a pivoting means for the needles. A compass card (not shown) may be mounted on the compass needles to indicate relative displacements between the needles and the compass bowl with reference to a lubber's line on the bowl.

At the ends of needles 13 and 14 are attached plates 16 and 17 which are adapted for relative movement with respect to plates 18 and 19, respectively, said last mentioned plates being attached in diametrically opposed relation on the compass bowl 11. Plates 16, 17, 18 and 19 may be of copper or any other suitable conducting material and arranged so that plates 18 and 19 form an electrical condenser having the liquid 12 as a dielectric therebetween and the capacity of the condenser being adapted to be varied by relative motion between plates 18—16 and 19—17 produced by the relative motion between the compass bowl 11 and compass needles 13 and 14. Plates 18 and 19 are connected to an oscillator 20 having an output circuit which includes an inductance coil 21 to form an oscillatory circuit 22 which may be tuned to resonance at either one of two selected or predetermined frequencies depending upon whether the movement of the bowl 11 is clockwise or counter-clockwise, that is, when bowl 11 is moved to the right a certain relative angular distance, circuit 22 will become resonant at one of the predetermined frequencies and when it is moved to the left, circuit 22 will become resonant at the other of said frequencies.

The liquid 12 is of such viscosity as to secure the desired damping of the oscillations of the magnetic needles and of such character that it does not act as a conductor of electricity or tend to cause the deterioration of the needles by chemical action because of their direct contact with the liquid. The relative movement between plates 18—16 and 19—17 increases the amount of liquid dielectric between the plates whereby the capacity of the condenser is varied in accordance therewith.

Translating and indicating means are provided in combination with the above described condenser and circuit 22 whereby relative angular movements between the mobile object and the directional element are repeated at a selected point or points which may, if desired, be located at a considerable distance from the directional element. To this end, a pair of electrical circuits 23 and 24 are arranged in energy-transfer relation with circuit 22 and each of said circuits includes a coil 25, 26, respectively, which are in inductive relation with coil 21. Circuit 23 includes, in addition to coil 25, a condenser 27 which may be in series or in shunt relation with coil 25, a rectifier 28 and a coil 29. Circuit 24 on the other hand includes, in addition to coil 26, a condenser 30 which may also be in series or shunt relation with coil 26, a rectifier 31 and a coil 32. The inductance and capacity values of coils 25, 26 and condensers 27, 30 respectively, are such that circuit 23 is resonant to one selected or predetermined frequency while circuit 24 will be resonant to a different selected or predetermined frequency.

As previously stated, circuit 22 is adapted to be tuned to resonance at either one of two selected frequencies and accordingly the inductance and capacity values of coil 21 and condenser 18—19, respectively, are such that when bowl 11 is rotated a selected relative distance in one direction, the circuit 22 will become resonant to the frequency of circuit 23 thereby producing a maximum transfer of energy between the two circuits while, when the bowl rotates in the opposite direction, circuit 22 will become resonant at the frequency of circuit 24 and a maximum transfer of energy will then take place between circuits 22 and 24. The resonant frequency currents then flowing in circuits 23 or 24 are rectified by means of rectifiers 28 or 31 and the rectified currents are then caused to flow through coils 29 and 32. The latter are wound in opposed relation and mounted on a common supporting means (not shown). As illustrated, the coils are arranged between the pole pieces 33 and 34 of a magnet 35 which may be a permanent magnet or an electro-magnet of the horseshoe type.

It will be apparent that when current flows in coil 29, the reaction between the field of said coil and the magnet will produce rotation of the common support in one direction while, when current flows in coil 32, the reaction produced between the latter and magnet 35 will cause rotation of the support in the reverse direction. Attached to the common support of coils 29 and 32, in any suitable manner, is a pointer 36 arranged to traverse a scale 37 to indicate movement of the coils either to the left or to the right of its normal or neutral position depending on whether one or the other of said coils is energized in accordance with the tuning of circuit 22 produced by relative motion between the bowl 11 and the compass needles 13 and 14.

Referring to Fig. 2, in which is plotted graphically the deflection of coils 29 and 32 with respect to the frequency of the circuits 23 and 24, curve f1 represents the resonance curve of circuit 23 and curve f2 represents the resonance curve of circuit 24. The maximum resonance of circuit 23 is represented by the frequency a while maximum resonance of circuit 24 is represented by the frequency b at which corresponding maximum deflections of coil 29—32 take place in one direction or the other as indicated. When circuit 22 is tuned to an intermediate frequency denoted at c, substantially no transfer of energy takes place to circuits 23 and 24 and consequently very little or no reaction takes place between the fields of coil 29, 32 and the field of magnet 35 and the pointer 36 remains at the zero or central position.

When bowl 11 is in the position indicated in Fig. 1, the circuit 22 is not in resonance with either circuit 23 or 24 and substantially no transfer of energy takes place. Accordingly the pointer 36 remains in zero position. However, as the mobile object on which the mechanism is mounted veers to the right, bowl 11 will move therewith to the right and cause a variation in capacity of the condenser 18, 19 thereby tuning the circuit 22 to resonance at the frequency of circuit 23. Reaction is now produced between the fields of coil 29 and magnet 35 whereby the pointer 36 is moved to the right along scale 37. When the mobile object veers to the left, circuit 22 is then tuned to resonance at the frequency of the circuit 24 thereby producing a reaction between the fields of coil 32 and magnet 35 whereupon pointer 36 will move to the left on the scale 37.

Thus a novel means is provided in combination with a magnetic compass which accurately and effectively repeats relative angular movements between a mobile object and the directional element of the compass carried by said object thereby enabling the pilot or navigator of said mobile object, which may be a ship or aircraft, to quickly perceive, at a point or points which may if desired be located at a distance from the compass, whether he is on or off his course and to pilot the craft accordingly.

The device is quite simple and easily constructed thereby reducing the cost of manufacture and yet is rugged enough to withstand hard use under the trying conditions generally encountered in aerial navigation without sacrificing or decreasing the efficiency of the device. The magnetic compass may be mounted in any convenient location on a ship or aircraft, for example, while the indicator or repeater which is operated thereby may be conveniently mounted on the instrument panel in the cockpit of an aircraft or on the bridge of a vessel, etc.

Reference will be had to the appended claims for a definition of the limits of the invention.

What is claimed is:

1. In apparatus of the class described, a magnetic compass element adapted to be mounted on a mobile object, a support for said element, said support and element being adapted for relative angular movement, electro-responsive means carried by said mobile object and including a magnet having a pair of poles, a pair of oppositely wound coils disposed between said poles and a pointer adapted to be actuated by said coils for indicating the relative angular movement, and circuit means for actuating said electro-responsive means, said circuit means comprising three separate circuits two of which are in energy-transfer relation with the third, said third circuit having alternating current therein and a condenser associated with said compass element, said condenser having means operated by said compass element for varying the capacity thereof within predetermined limits upon relative angular movement between said compass element and said support whereby said circuit may be tuned to resonance at either one of two predetermined frequencies according to said relative angular movement being clockwise or counter-clockwise, the remaining two circuits each including one of the coils of the electro-responsive means and separate rectifying means, each of said last-mentioned two circuits being tuned to one of said two predetermined frequencies, respectively, whereby one or the other of said circuits receives a maximum transfer of energy from said first circuit when said first circuit is tuned to the corresponding predetermined frequency, said rectifying means functioning to rectify the induced currents, whereby the pointer of said electro-responsive means is actuated.

2. In combination with a magnetic compass needle, a container for carrying said needle and adapted for rotary movement relative thereto, a condenser carried by said container, means carried by said compass needle for varying the capacity of said condenser upon relative movement between said container and said compass needle, a source of alternating current, a plurality of electrical circuits one of which includes said condenser and is supplied with current from said source and is adapted to be tuned to resonance at either one of two different frequencies by the variation in capacity of said condenser when said relative movement is in one direction or the other, the other two circuits being in energy-transfer relation with said first circuit and tuned to the two frequencies, respectively, and electro-responsive means associated with said circuits and operative upon tuning of said first circuit, said electro-responsive means including a pointer and means energized by said other two circuits for moving said pointer to the left or right of a normally central position according to whether the relative movement between the container and the compass needle is in one direction or another.

3. In apparatus for indicating the deviation of a craft to the left or to the right of a predetermined course, a magnetic compass including a bowl having a variable condenser therein, a magnetic element pivoted in said bowl, an electric circuit including said condenser whereby the capacity of said circuit may be varied from a predetermined value in either direction, means for producing an alternating current in said circuit, an electro-responsive indicator remote from said compass and including a pointer and means for moving said pointer to the left or right of a normally central zero position, circuit means including said pointer-actuating means for coupling said indicator to said first circuit whereby said pointer is maintained in its central zero position when the capacity of the condenser is at the predetermined value and the craft is on its course, and means operated by the magnetic element of the compass for varying the capacity of said condenser and its circuit from said predetermined value upon deviation of the craft to the left or right of the predetermined course whereby said pointer is actuated by its actuating means to the left or right of the zero position in accordance with said deviation.

4. In apparatus for indicating the deviation of a craft to the left or right of a predetermined course, a magnetic compass, an electric circuit, means for producing an alternating current in said circuit, a pair of circuits coupled to said first circuit, an electro-responsive indicator including a pointer and means energized by said pair of circuits for actuating said pointer to the left or right of a normally central zero position, the currents in said pair of circuits being normally equal whereby said pointer is maintained in said central zero position, and a condenser in said first circuit and having means controlled by the compass for varying the capacity of said circuit when the craft deviates to the left or right of the predetermined course whereby more current flows in one or the other of said pair of circuits to cause said pointer to be actuated by its actuating means to the left or right of its normally central zero position in accordance with said deviation.

5. In apparatus for indicating the deviation of a craft to the left or right of a selected course, a magnetic compass element, a container carrying said element and adapted for rotary movement relative thereto, a condenser carried by said container, means carried by said compass element for varying the capacity of said condenser from a predetermined value upon relative movement between said container and said compass element, a source of alternating current, a plurality of electric circuits at least one of which includes said condenser and is supplied with alternating current from said source, the other circuits being coupled to said first circuit whereby current is caused to flow in said other circuits upon said variation of the capacity of said condenser, and electro-responsive means associated with said other circuits and including a pointer and means energized by said other circuits for moving said pointer to the left or right of a normally central zero position according to whether the relative movement between the container and the compass element is in one direction or another.

6. In apparatus for indicating the deviation of a craft to the left or right of a selected course, a magnetic compass element, a container for said element and adapted for rotary movement relative thereto, a condenser carried by said container and having a predetermined value of capacity for a selected course which the craft is to follow and including means carried by said compass element for varying the capacity of said condenser from said value when relative movement takes place between said container and said element upon deviation of the craft from the selected course, a source of alternating current, an electro-responsive indicator, and an electric circuit arrangement including said condenser, said source and said electro-responsive indicator, the latter including a pointer normally maintained in a central zero position when the craft is on the selected course, and means connected to and energized by currents from said circuit arrangement for actuating said pointer to the left or right of its central zero position according to whether the relative movement between the container and the compass element is in one direction or another due to deviation of the craft to one side or the other of the selected course.

7. In apparatus for indicating the deviation of a craft to the left or right of a selected course, a magnetic compass element, a container for said element and adapted for rotary movement relative thereto, a condenser carried by said container and having a predetermined value of capacity for a selected course which the craft is to follow, said condenser including means carried by said compass element for varying the capacity of said condenser from said value when relative movement takes place between said container and said compass element upon deviation of the craft from the selected course, a vacuum tube oscillator for generating an alternating current, an electro-responsive indicator, and an electric circuit arrangement including said condenser, said oscillator and said electro-responsive indicator, the latter including a pointer normally maintained in a central zero position when the craft is on the selected course, and means connected to and energized by currents from said circuit arrangement for actuating said pointer to the left or right of its central zero position according to whether the relative movement between the container and the compass element is in one direction or another due to deviation of the craft to one side or the other of the selected course.

ADOLPH URFER.